US012502951B2

United States Patent
Wollmuth et al.

(10) Patent No.: US 12,502,951 B2
(45) Date of Patent: Dec. 23, 2025

(54) DYNAMIC BAFFLES FOR DEBRIS PANELS

(71) Applicant: CNH Industrial America LLC, New Holland, PA (US)

(72) Inventors: Paul T. Wollmuth, Fargo, ND (US); Panos Tamamidis, Northbrook, IL (US); Kaushal Ghorpade, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 385 days.

(21) Appl. No.: 18/078,506

(22) Filed: Dec. 9, 2022

(65) Prior Publication Data

US 2024/0190239 A1 Jun. 13, 2024

(51) Int. Cl.
*B60K 11/08* (2006.01)
*B62D 25/10* (2006.01)

(52) U.S. Cl.
CPC ............ *B60K 11/085* (2013.01); *B62D 25/10* (2013.01)

(58) Field of Classification Search
CPC ....... B60K 11/085; B60K 11/04; B60K 11/08; B62D 25/10
See application file for complete search history.

(56) References Cited

U.S. PATENT DOCUMENTS

| | | | | |
|---|---|---|---|---|
| 2,551,921 A * | 5/1951 | Arsem | ...................... | F01P 7/12 123/41.04 |
| 2,733,772 A * | 2/1956 | Lamb | .................... | B60K 11/08 280/847 |
| 4,081,050 A * | 3/1978 | Hennessey | ......... | B62D 49/0621 180/68.1 |
| 4,086,976 A * | 5/1978 | Holm | .................. | B60R 13/0838 180/68.1 |
| 5,794,733 A * | 8/1998 | Stosel | .............. | F02M 35/10137 180/68.1 |

(Continued)

FOREIGN PATENT DOCUMENTS

| | | | | |
|---|---|---|---|---|
| CA | 2299828 C | * | 5/2005 | ............. B60K 11/08 |
| DE | 10048958 A1 | * | 4/2001 | ......... B60R 13/0838 |

(Continued)

OTHER PUBLICATIONS

CA-2299828-C English Translation (Year: 2005).*

(Continued)

*Primary Examiner* — Michael T. Walsh
(74) *Attorney, Agent, or Firm* — Foley & Lardner LLP (57) ABSTRACT

A machine includes a chassis, a cab coupled to the chassis, a hood positioned in front of the cab where the chassis and the hood define an internal compartment therebetween, a prime mover positioned within the internal compartment, a cooling pack positioned within the internal compartment, a fan positioned within the internal compartment and configured to drive an airflow through the cooling pack, a first debris shield positioned along a first side of the internal compartment, and a second debris shield positioned along an opposing second side of the internal compartment. Each of the first debris shield and the second debris shield includes a shield body defining a vent, a baffle positioned proximate the vent, and an actuator configured to reposition the baffle from an open orientation to a closed orientation.

20 Claims, 6 Drawing Sheets (56) References Cited

U.S. PATENT DOCUMENTS

| | | | | |
|---|---|---|---|---|
| 5,950,753 | A * | 9/1999 | Muldoon | B60K 11/00 |
| | | | | 180/69.2 |
| 7,559,391 | B2 * | 7/2009 | Bradley | B60K 11/085 |
| | | | | 180/68.1 |
| 8,479,853 | B2 * | 7/2013 | Verbrugge | F01P 11/10 |
| | | | | 180/68.2 |
| 9,452,674 | B2 * | 9/2016 | Adamson | B60K 11/04 |
| 9,579,968 | B2 * | 2/2017 | Rizzon | B60K 11/08 |
| 10,487,476 | B2 * | 11/2019 | Kumagai | E02F 9/0866 |
| 11,091,026 | B2 * | 8/2021 | Mussack | B60K 13/02 |
| 2012/0097465 | A1 * | 4/2012 | Leffert | F01P 7/12 |
| | | | | 180/68.1 |

FOREIGN PATENT DOCUMENTS

| | | | | |
|---|---|---|---|---|
| JP | 2003097131 | A * | 4/2003 | |
| JP | 2008106727 | A * | 5/2008 | |

OTHER PUBLICATIONS

DE-10048958-A1 English Translation (Year: 2001).*
JP-2008106727-A English Translation (Year: 2008).*
JP-2003097131-A English Translation (Year: 2003).*

* cited by examiner

DYNAMIC BAFFLES FOR DEBRIS PANELS

BACKGROUND

Machines and vehicles include cooling packages to thermally regulate the temperature of various components and systems thereof (e.g., driveline components, hydraulic systems, air conditioning systems, etc.). Such cooling packages typically include a fan to drive air through one or more heat exchangers.

SUMMARY

One embodiment relates to a machine. The machine includes a chassis, a cab coupled to the chassis, a hood positioned in front of the cab where the chassis and the hood define an internal compartment therebetween, a prime mover positioned within the internal compartment, a cooling pack positioned within the internal compartment, a fan positioned within the internal compartment and configured to drive an airflow through the cooling pack, a first debris shield positioned along a first side of the internal compartment, and a second debris shield positioned along an opposing second side of the internal compartment. Each of the first debris shield and the second debris shield includes a shield body defining a vent, a baffle positioned proximate the vent, and an actuator configured to reposition the baffle from an open orientation to a closed orientation.

Another embodiment relates to a cooling system for a machine. The cooling system includes a debris shield configured to be positioned along a side of a hood of the machine. The debris shield includes a shield body defining a plurality of vents, a plurality of baffles, and one or more actuators configured to reposition the plurality of baffles between an open orientation and a closed orientation. Each of the plurality of baffles is positioned proximate a respective one of the plurality of vents.

Still another embodiment relates to a machine. The machine includes a chassis, a cab coupled to the chassis, a hood positioned in front of the cab where the chassis and the hood define an internal compartment therebetween, a prime mover positioned within the internal compartment, a cooling pack positioned within the internal compartment, a fan positioned within the internal compartment and configured to drive an airflow through the cooling pack, a first debris shield positioned along a first side of the internal compartment and at least partially defining a first front tractive element well, a second debris shield positioned along an opposing second side of the internal compartment and at least partially defining a second front tractive element well, a sensor configured to acquire data regarding an operating characteristic of the machine, and a controller. Each of the first debris shield and the second debris shield includes a shield body defining a vent, a baffle positioned proximate the vent, and an actuator configured to reposition the baffle between an open orientation and a closed orientation. The controller is configured to engage the actuator based on the operating characteristic to selectively alter an amount of the airflow that is vented from the internal compartment through the vent to an ambient environment and differentially control an amount that the baffle of the first debris shield is open relative to an amount that the baffle of the second debris shield is open based on a direction of rotation of the fan.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a machine or vehicle of the present disclosure includes a cooling system that includes a fan and debris panels. The fan is configured to drive air through a cooling pack and toward a prime mover (e.g., an engine) and a cab of the machine or vehicle. The debris panels define a plurality of vents and include a plurality of baffles. The baffles are repositionable between an open orientation and a closed orientation (e.g., via passive actuators, via actively controllable actuators, etc.) to vary an amount of the air provided by the fan that exhausts through the vents of the debris panels to an ambient environment.

Overall Vehicle

Figure 1:
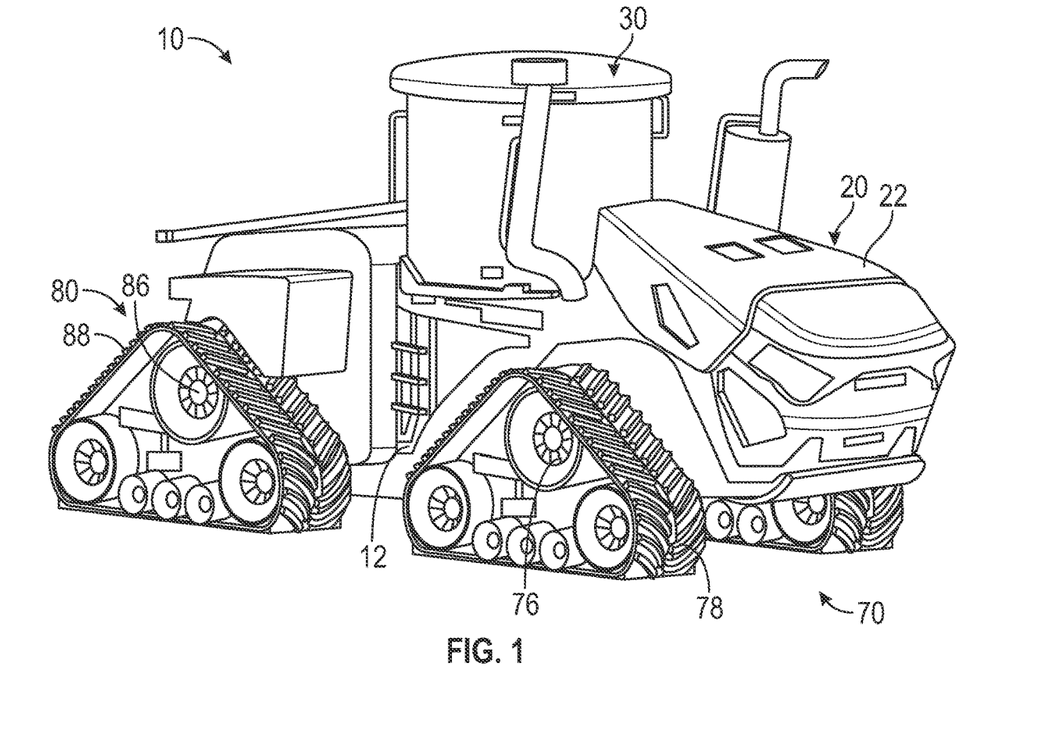
FIG. 1 is a perspective view of a vehicle, according to an exemplary embodiment.
Figure 2:
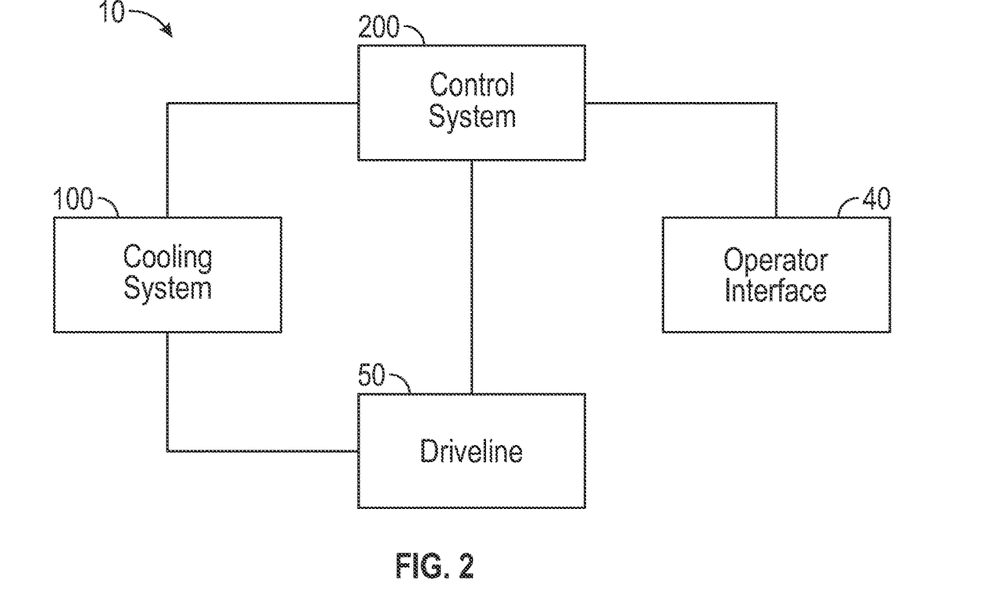
FIG. 2 is a schematic block diagram of the vehicle of FIG. 1, according to an exemplary embodiment.
Figure 3:
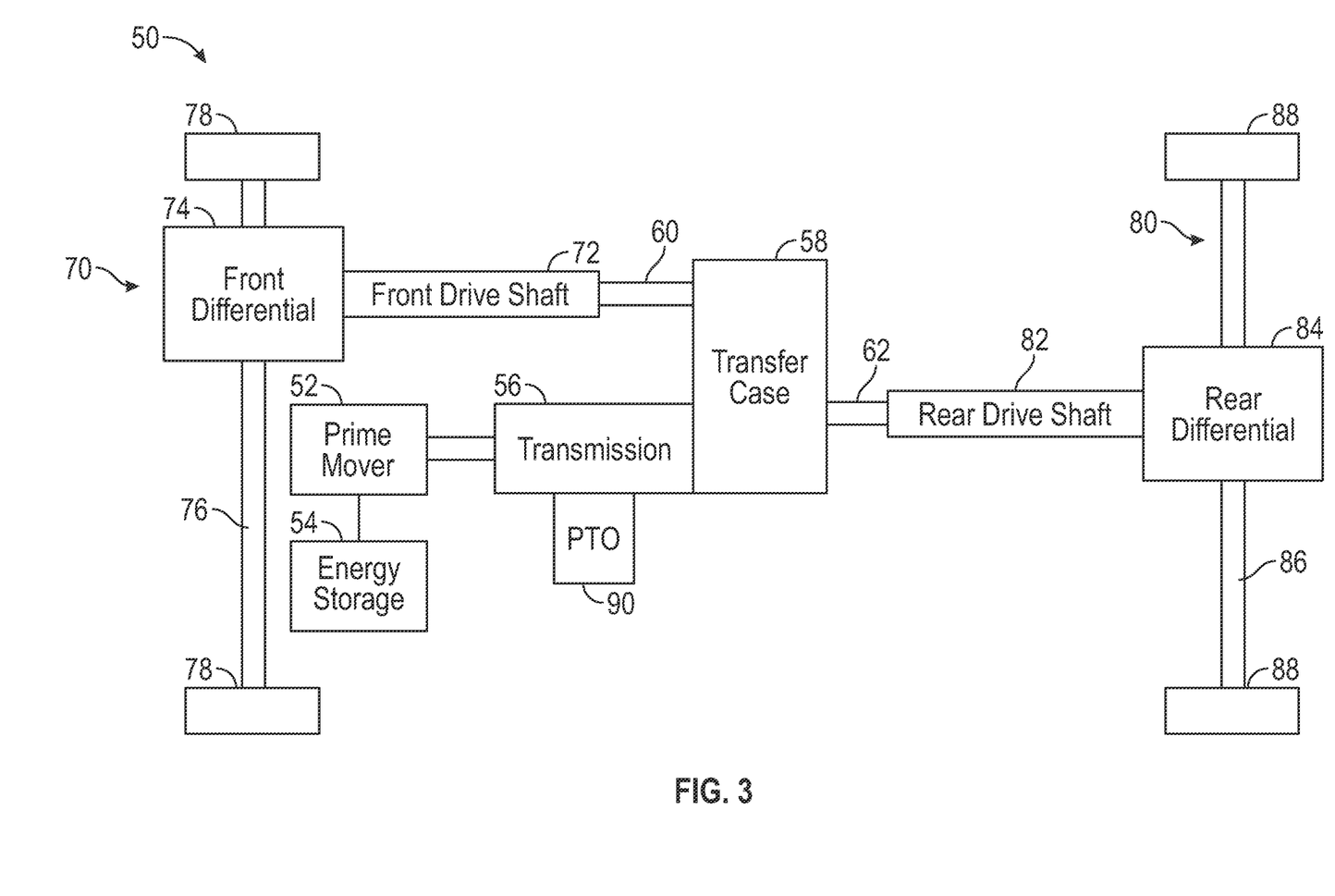
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having a hood, shown as hood 22, and an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle cooling assembly, shown as cooling system 100, disposed under the body 20 (e.g., under the hood 22 thereof) and configured to facilitate cooling one or more components of the vehicle 10 (e.g., an engine, etc.); and a vehicle control system, shown as control system 200. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input devices may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as track elements. In other embodiments, the front tractive elements 78 and the rear tractive elements 88 are otherwise structured (e.g., wheels, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover 52 that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover 52 that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Cooling System

Figure 4:
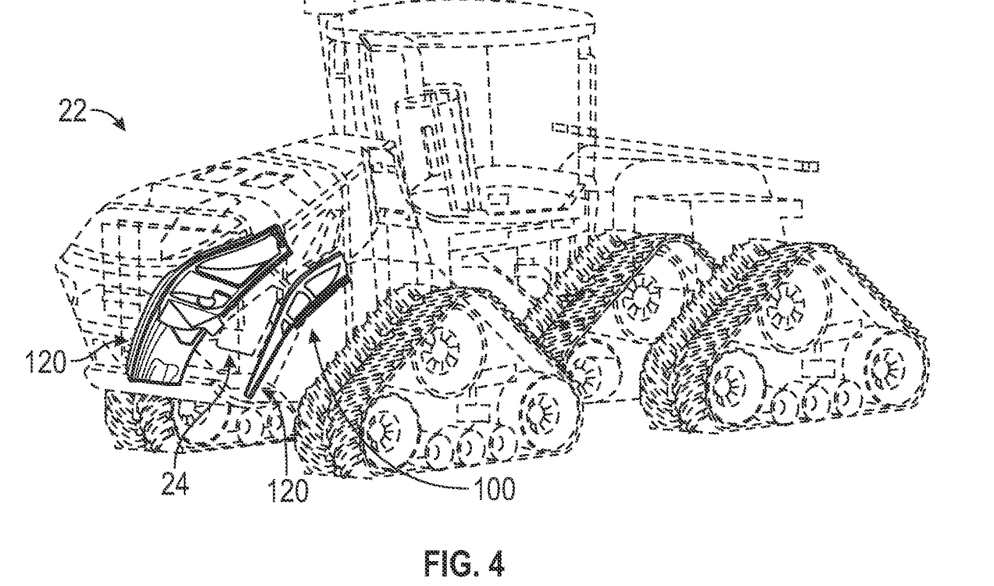
FIG. 4 is a detailed view of debris panels of a cooling system of the vehicle of FIG. 1, according to an exemplary embodiment.
Figure 5:
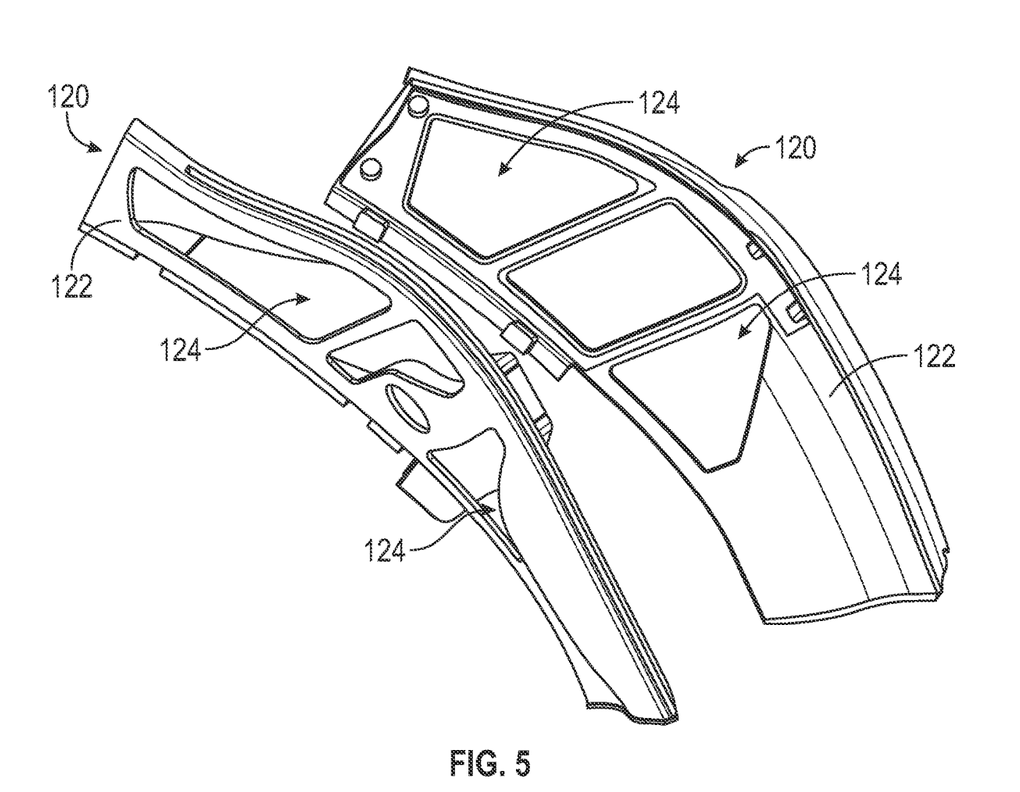
FIGS. 5 and 6 are various detailed views the debris panels of FIG. 4, according to an exemplary embodiment.
Figure 6:
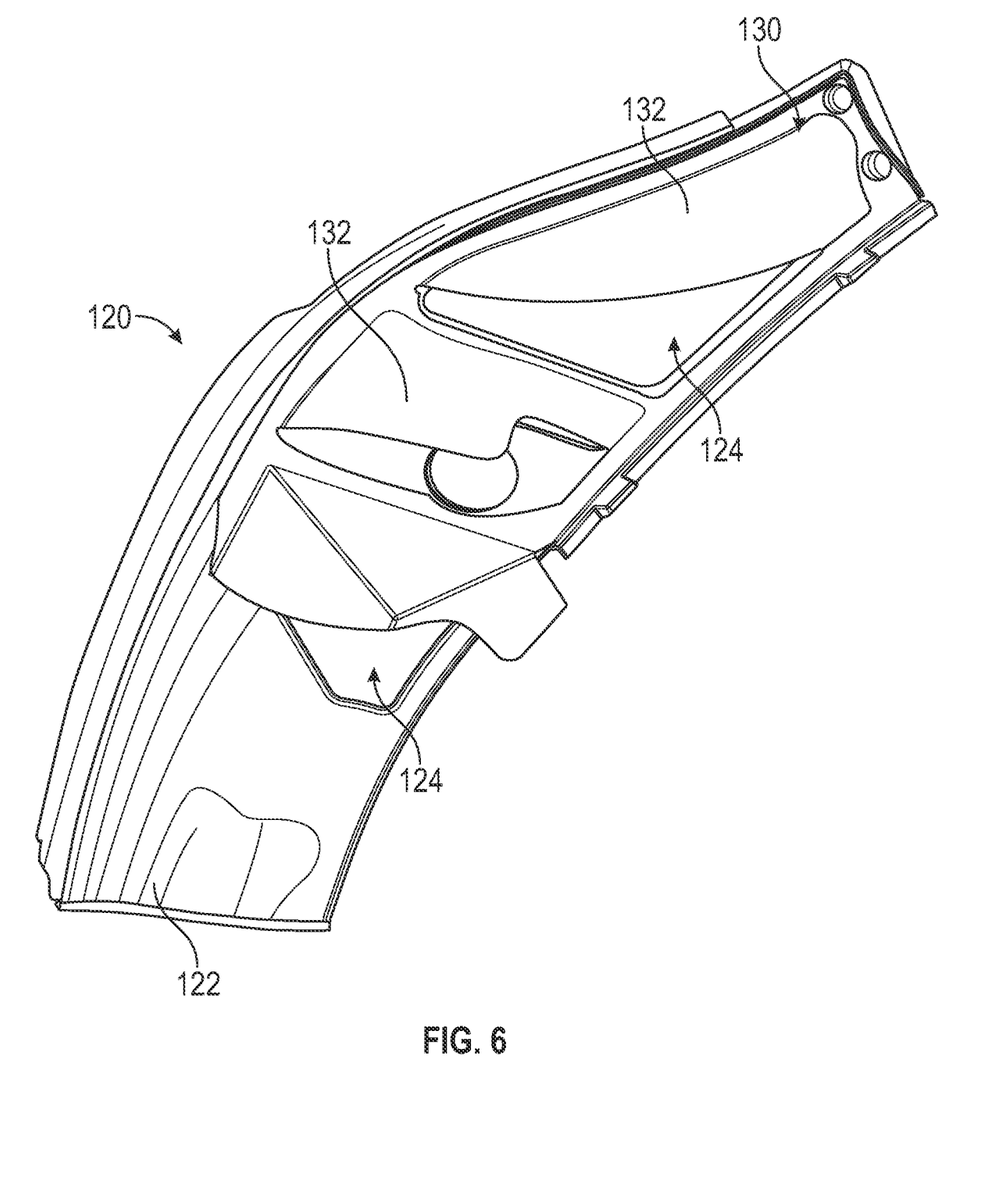
Figure 7:
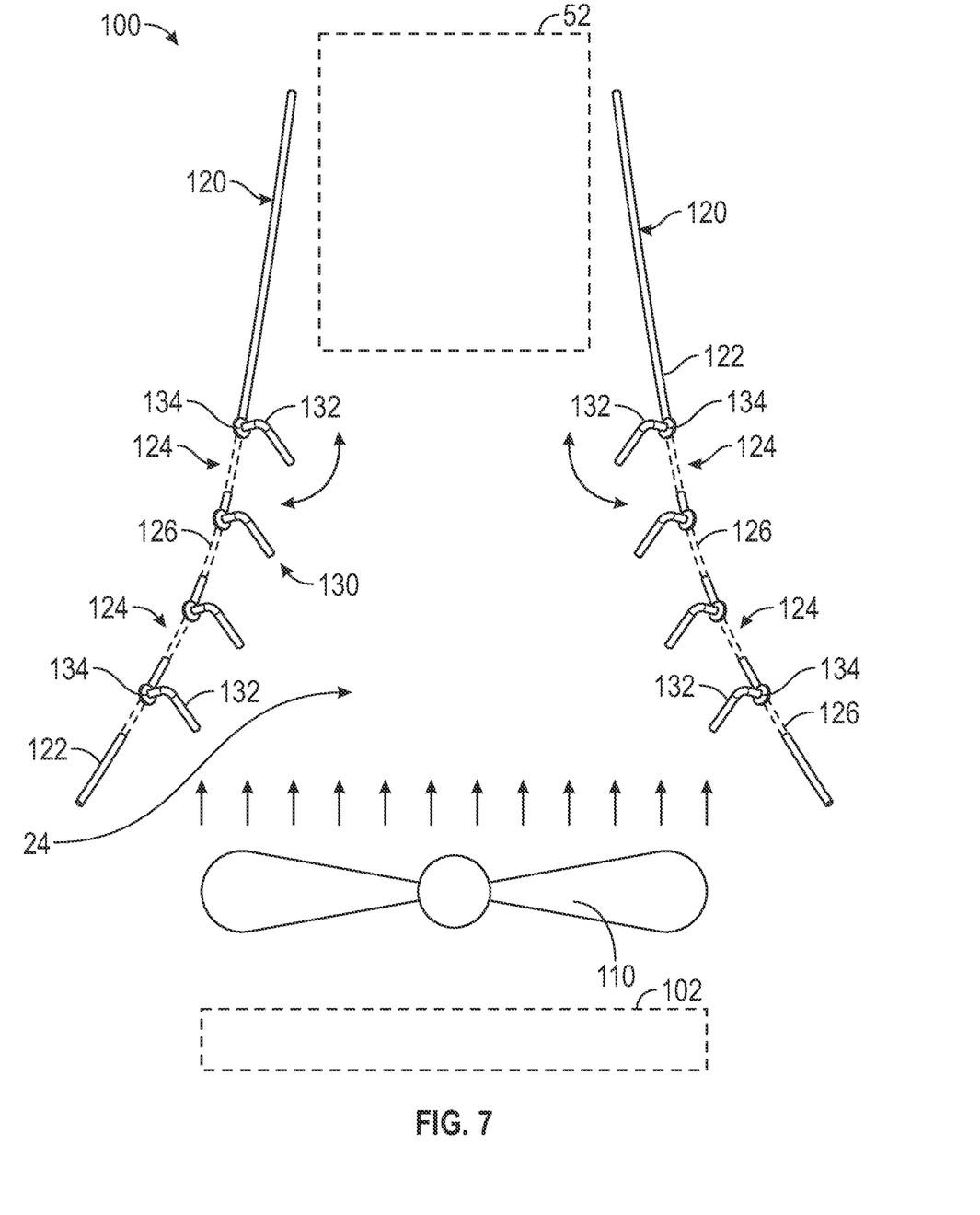
FIG. 7 is a cross-sectional view of the debris panels and the cooling system of FIG. 4, according to an exemplary embodiment.

According to the exemplary embodiment shown in FIGS. 4-8, the cooling system 100 includes (a) one or more heat exchangers, shown as cooling pack 102, (b) an air driver, shown as fan 110, and (c) a pair of shields, guards, barriers, covers, protectors, or escutcheons, shown as debris shields 120. According to an exemplary embodiment, the fan 110 is positioned to drive air through the cooling pack 102 (e.g., heat exchangers thereof such as an engine radiator, a fuel cooler, an oil cooler, an air conditioning condenser, a charge air cooler, etc.) to facilitate thermally regulating or cooling components of the vehicle 10 and/or the driveline 50 (e.g., air conditioning, fuel, oil, the prime mover 52, air flowing into/out of a turbocharger, etc.). As shown in FIGS. 4 and 7, the cooling system 100 is positioned within an internal chamber, compartment, or cavity, shown as hood chamber 24, defined between the hood 22 and the frame 12, and proximate the front end of the vehicle 10.

Figure 8:
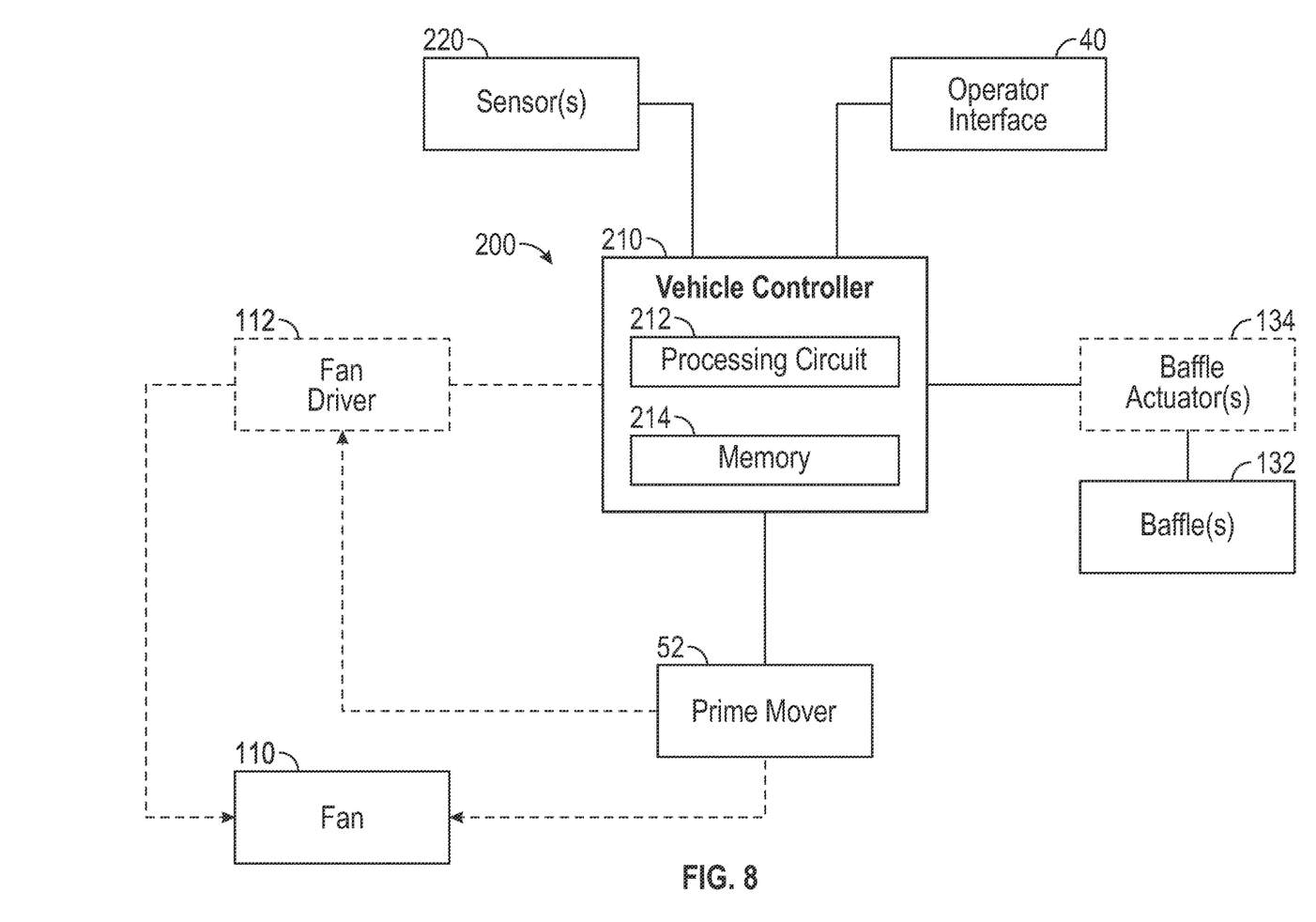
FIG. 8 is a schematic block diagram of a control system of the vehicle of FIG. 1, according to an exemplary embodiment.

According to the exemplary embodiment shown in FIG. 8, the cooling system 100 includes an independent fan driver (e.g., an electric motor), shown as fan driver 112, that drives the fan 110 to force or drive (e.g., pull, push, etc.) air through the various cooling components of the cooling pack 102 and towards the prime mover 52 and the cab 30. In other embodiments, the fan driver 112 is not independent of the prime mover 52, but rather, the fan 110 is driven by the prime mover 52. By way of example, the fan driver 112 may be a pneumatically-operated motor or a hydraulically-operated motor coupled to a pneumatic pump or a hydraulic pump, respectively, that is driven by the prime mover 52. In still another embodiment, the vehicle 10 does not include the fan driver 112, but instead the fan 110 is mechanically driven by the prime mover 52 (e.g., through the PTO 90, through a pulley assembly coupled to the PTO 90, etc.). As shown in FIG. 7, the fan 110 is positioned between the cooling pack 102 and the prime mover 52 such that the fan 110 is configured to pull air through the cooling pack 102 and push air towards the prime mover 52 and the cab 30. In some embodiments, the fan 110 is positioned proximate a front of the hood 22 and in front of the prime mover 52 and the cooling pack 102 such that the fan 110 is configured to push air through the cooling pack 102 and towards the prime mover 52 and the cab 30.

As shown in FIGS. 4 and 7, the debris shields 120 are positioned along the sides and/or underneath the hood 22 (e.g., to at least partially define the front tractive element wells for the front tractive elements 78, to at least partially define the compartment (i.e., the hood chamber 24) within which the fan 110, the cooling pack 102, and/or the prime mover 52 are positioned, etc.). More specifically, (a) a first one of the debris shields 120 is positioned along a left side of the vehicle 10 and at least partially defines a left side of the hood chamber 24 and a left tractive element well, and (b) a second one of the debris shields 120 is positioned along a right side of the vehicle 10 and at least partially defines a right side of the hood chamber 24 and a right tractive element well. The debris shields 120 may be coupled to the frame 12 and/or the hood 22. In some embodiments, the debris shields 120 are removably coupled to the frame 12 and/or the hood 22 (e.g., to facilitate cleaning the debris shields 120, to facilitate maintenance of the prime mover 52 and/or the cooling pack 102, etc.). By way of example, the debris shields 120 may be coupled to the frame 12 and/or the hood 22 with one or more removable fasteners (e.g., bolts, pins, clips, etc.).

As shown in FIGS. 5-7, each of the debris shields 120 has a body portion, shown as shield body 122, (a) with a curved or arcuate shape (e.g., to define the tractive element wells) and (b) that defines one or more apertures or passages, shown as vents 124, spaced along a length of the debris shields 120 and that fluidly couple the inner volume of the hood chamber 24 to the surrounding ambient environment through the shield body 122 of the debris shields 120. The vents 124, therefore, facilitate ventilation of air from the hood chamber 24 to the surrounding ambient environment. As shown in FIGS. 5 and 6, the shield body 122 of the debris shields 120 defines three vents 124. As shown in FIG. 7, the shield body 122 of the debris shields 120 defines four vents 124. In other embodiments, the shield body 122 of the debris shields 120 defines more or fewer of the vents 124 (e.g., one, two, five, etc.).

The debris shields 120 may further include one or more pieces of mesh, webbing, screens, and/or filters that extend over the vents 124. The mesh, webbing, screens, and/or filters may be manufactured from a perforated material that includes a series of holes that are large enough to permit the passage of air and other gases therethrough, but small enough to prevent the passage of debris therethrough (e.g., dirt, mud, rocks, stones, crops, organic material, leaves, stalks, chaff, etc.). The mesh, webbing, screens, and/or filters may be made from plastic, metal, or another suitable material.

As shown in FIGS. 6-8, each of the debris shields 120 includes a flow diverter assembly, shown as baffle system 130, that includes one or more flow guides or flow diverters, shown as baffles 132. Each of the baffles 132 is associated with and positioned proximate a respective one of the vents 124. As shown in FIGS. 6 and 7, the baffles 132 extend inward from the shield body 122, into the hood chamber 24, and at least partially across the vents 124. According to an exemplary embodiment, the baffles 132 are positioned to guide air from the hood chamber 24 through the vents 124. During operation, the components of the driveline 50 (e.g., the prime mover 52, etc.) may generate thermal energy that is desirable to dissipate or reject to the surrounding environment (e.g., to reduce the temperature of the prime mover 52) and/or air driven through the cooling pack 102 may be heated to an elevated temperature. At least a portion of such air with an increased temperature may pass out of the hood chamber 24 through the vents 124 and as directed by the baffles 132 (e.g., passively, as actively forced by one or more fans, etc.).

As shown in FIGS. 7 and 8, the baffle system 130 for each of the debris shields 120 includes one or more actuators, shown as baffle actuators 134. According to an exemplary embodiment, the baffle actuators 134 are configured to facilitate passive and/or active manipulation of the position and/or orientation of the baffles 132 (e.g., pivot, slide, etc.) to at least partially open and/or close the vents 124 to increase or decrease the airflow through the vents 124. In some embodiments, a single baffle actuator 134 is configured to facilitate manipulation of the position and/or orientation of all of the baffles 132 of a respective one of the debris shields 120.

In some embodiments, the baffle actuators 134 are passive actuators (e.g., springs, torsion springs, etc.) that bias the baffles 132 into or towards a closed orientation. By way of example, the passive actuators may be configured to bias (e.g., pivot) the baffles 132 closed when the fan 110 is off and permit the baffles 132 to open when the fan 110 is on based on the strength/speed/force of the airflow provided by the fan 110 when the fan 110 is on. For example, when the airflow provided by the fan 110 is less, the passive actuators may be configured to only permit the baffles 132 to partially open, and when the airflow provided by the fan 110 is more (e.g., at or close to a maximum airflow), the passive actuators may be configured to permit the baffles 132 to fully or almost fully open.

In some embodiments, the baffle actuators 134 are active actuators (e.g., motors, etc.) that facilitate actively repositioning the baffles 132 between an open orientation and a closed orientation. By way of example, the active actuators may be configured to be controllable (e.g., by the control system 200) based on operating characteristics of the vehicle 10, the driveline 50, and/or the cooling system 100 (e.g., a temperature of the prime mover 52 and/or other components of the driveline 50, a temperature of components of the cooling pack 102, a speed of the vehicle 10, a speed of the fan 110, etc.). For example, under certain circumstances, the baffle actuators 134 may be controlled to fully open, fully close, or partially open/close the baffles 132 to divert more or less airflow out of the hood chamber 24 through the vents 124.

According to the exemplary embodiment shown in FIG. 8, the control system 200 for the vehicle 10 includes a controller 210. In one embodiment, the controller 210 is configured to selectively engage, selectively disengage, control, or otherwise communicate with components of the vehicle 10. As shown in FIG. 8, the controller 210 is coupled to (e.g., communicably coupled to) the operator interface 40, the prime mover 52, the fan driver 112, the baffle actuators 134, and one or more sensors, shown as sensors 220. By way of example, the controller 210 may send and receive signals (e.g., control signals) with the operator interface 40, the prime mover 52, the fan driver 112, the baffle actuators 134, and/or the sensors 220.

The controller 210 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 8, the controller 210 includes a processing circuit 212 and a memory 214. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212. In some embodiments, the controller 210 may represent a collection of processing devices. In such cases, the processing circuit 212 represents the collective processors of the devices, and the memory 214 represents the collective storage devices of the devices.

The sensors 220 may include one or more sensors that are configured to acquire sensor data to facilitate monitoring operational parameters/characteristics (e.g., temperatures, pressures, flow rates, etc.) of (a) components of the cooling system 100 (e.g., speed of the fan 110, temperatures of the components of the cooling pack 102 or fluid temperatures/pressures of fluid flowing therethrough, etc.), (b) the components of the driveline 50 (e.g., a temperature of the prime mover 52, a heat load on the prime mover 52 from the air provided to the exterior thereof by the fan 110, etc.), (c) the cab 30 (e.g., a heat load on the cab 30 from the air provided to the exterior thereof by the fan 110, etc.), and/or (d) the vehicle 10 (e.g., a travel speed thereof, a mode of operation thereof, etc.) with the controller 210. By way of example, the sensors 220 may include one or more temperature sensors (e.g., an inlet engine coolant temperature sensor, an outlet engine coolant temperature sensor, an engine temperature sensor, etc.) that are configured to facilitate monitoring temperature of the engine coolant flowing into and/or out of the engine of the prime mover 52 and/or the engine radiator, and/or the temperature of the engine of the prime mover 52 itself. By way of another example, the sensors 220 may include one or more temperature sensors (e.g., hood chamber air temperature sensors, etc.) that are configured to facilitate monitoring a temperature of the airflow within the hood chamber 24 that flows from the cooling pack 102, that is provided to the exterior of the prime mover 52, and/or that is provided to the exterior/front of the cab 30. By way of another example, the sensors 220 may include a speed sensor that is configured to facilitate monitoring the speed of the fan 110 and/or the fan driver 112. By way of another example, the sensors 220 may include a speed sensor that is configured to facilitate monitoring the speed of the vehicle 10. It should be understood that additional and/or different sensors (e.g., flow sensors, pressure sensors, etc.) may be used to facilitate monitoring the operational parameters/characteristics of the vehicle 10, the driveline 50, and/or the cooling system 100.

In some embodiments, the controller 210 is configured to control the baffle actuators 134 to actively reconfigure the orientation of the baffles 132 based on an operator input received via the operator interface 40 (e.g., a baffle orientation setting, close, open, partially open/closed, a mode selection, etc.). By way of example, the operator input may include a command to open or further open the baffles 132. By way of another example, the operator input may include a command to close or further close the baffles 132. By way of another example, the operator input may include a mode selection (e.g., a street or on-road mode, an off-road mode, a crop harvesting mode, etc.) and the controller 210 may be configured to control the baffle actuators 134 based on the mode selection. As one example, the controller 210 may be configured to open or partially open the baffles 132 via the baffle actuators 134 during a first mode of operation (e.g., the street or on-road mode, because of less debris being located on-road). As another example, the controller 210 may be configured to close or partially close the baffles 132 via the baffle actuators 134 during a second, different mode of operation (e.g., the off-road mode, the crop harvesting mode, because of more debris being located off-road or in crop fields, etc.)

In some embodiments, the controller 210 is configured to control the baffle actuators 134 to actively reconfigure the orientation of the baffles 132, in addition to or alternatively to the operator input, based on the sensor data acquired by the sensors 220. By way of example, the sensor data may indicate that the heat load on the prime mover 52 and/or the cab 30 from the airflow provided by the fan 110 is above a certain temperature threshold. In such an instance, the controller 210 may be configured to control the baffle actuators 134 to open or further open the baffles 132 to reject or expel a portion or an increased portion of the airflow provided by the fan 110 from the hood chamber 24 to reduce the external heat load on the prime mover 52 and/or the cab 30. By way of another example, sensor data may indicate that the operating characteristics are within desired ranges. In such an instance, the controller 210 may be configured to control the baffle actuators 134 to close or partially close the baffles 132 to reduce the possibility of the ingress of debris into the hood chamber 24 through the vents 124. By way of another example, the sensor data may indicate that the vehicle 10 is stationary (e.g., an idle condition) or moving at lower speeds. In such an instance, the controller 210 may be configured to control the baffle actuators 134 to open or further open the baffles 132 (e.g., because of the reduced risk of the ingress of debris into the hood chamber 24 through the vents 124 when the vehicle 10 is stationary or slow moving). By way of another example, the sensor data may indicate that the vehicle 10 is moving at elevated speeds (e.g., while off-road). In such an instance, the controller 210 may be configured to control the baffle actuators 134 to close or further close the baffles 132 (e.g., because of the increased risk of the ingress of debris into the hood chamber 24 through the vents 124 when the vehicle 10 is moving at elevated speeds and/or off-road). By way of another example, the sensor data may indicate that the fan 110 is running at a lower speed. In such an instance, the controller 210 may be configured to control the baffle actuators 134 to close or further close the baffles 132. By way of another example, the sensor data may indicate that the fan 110 is running at a higher speed. In such an instance, the controller 210 may be configured to control the baffle actuators 134 to open or further open the baffles 132. It should be understood that the controller 210 may monitor the various operating parameters and make a comprehensive decision based on the various monitored operating parameters on whether to further open or further close the baffles 132 via the baffle actuators 134 (e.g., to maintain desired operating temperatures, desired debris ingress mitigation, etc.).

In some embodiments, the controller 210 is configured to differentially control the amount that the baffles 132 on one side of the vehicle 10 are open/closed relative to the amount that the baffles 132 on the opposing side of the vehicle 10 are open/closed. By way of example, looking in a direction forward from the cab 30, if the fan 110 rotates counterclockwise from the perspective of the operator, the airflow proximate the right side of the hood chamber 24 will travel off the rear of the fan 110 in a relatively more upward direction, whereas the airflow proximate the left side of the hood chamber 24 will travel off the rear of the fan 110 in a relatively more downward direction. Such a differential between the directions of the airflow proximate the opposing sides of the hood chamber 24 can cause more air to be exhausted along one of the debris shields 120 while causing less air to be exhausted along the other one of the debris shields 120. Accordingly, the controller 210 may be configured to open the baffles 132 on one side of the hood chamber 24 more than the other side of the hood chamber 24 (or close the baffles 132 on one side of the hood chamber 24 more than the other) to account for the differential airflow (i.e., upward versus downward).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the cooling system 100, etc.) as shown in the various exemplary embodiments is illustrative only. Additionally, any element disclosed in one embodiment may be incorporated or utilized with any other embodiment disclosed herein.

The invention claimed is:

1. A machine comprising:
a chassis;
a cab coupled to the chassis;
a hood positioned in front of the cab, the chassis and the hood defining an internal compartment therebetween;
a prime mover positioned within the internal compartment;
a cooling pack positioned within the internal compartment;
a fan positioned within the internal compartment, the fan configured to drive an airflow through the cooling pack;
a first debris shield positioned along a first side of the internal compartment; and
a second debris shield positioned along an opposing second side of the internal compartment, each of the first debris shield and the second debris shield including:
a shield body defining a vent;
one or more baffles positioned proximate the vent, pivoting about a first end to extend inwardly into the internal compartment to divert the airflow through the vent to an exterior of the hood; and
an actuator configured to reposition the baffle from an open orientation to a closed orientation.

2. The machine of claim 1, wherein the shield body defines a plurality of vents, wherein each of the first debris shield and the second debris shield includes a plurality of baffles and a plurality of actuators, wherein each of the plurality of baffles is positioned proximate a respective one of the plurality of vents, and wherein each of the plurality of actuators is configured to reposition a respective one of the plurality of baffles from the open orientation to the closed orientation.

3. The machine of claim 1, wherein the actuator is configured to provide a biasing force that biases the one or more baffles towards the closed orientation, and wherein the airflow causes the one or more baffles to overcome the biasing force to reposition the one or more baffles from the closed orientation to the open orientation.

4. The machine of claim 1, wherein the actuator is configured to reposition the one or more baffles from the closed orientation to the open orientation.

5. The machine of claim 4, further comprising a controller configured to engage the actuator to selectively reposition the one or more baffles between the closed orientation and the open orientation.

6. The machine of claim 5, wherein the controller is configured to engage the actuator based on an operator input.

7. The machine of claim 6, wherein the operator input includes a selection of a mode of operation of the machine, wherein, during a first mode of operation, the controller is configured to engage the actuator to reposition the one or more baffles to the closed orientation, and wherein, during a second mode of operation, the controller is configured to engage the actuator to reposition the one or more baffles to the open orientation.

8. The machine of claim 5, further comprising a sensor configured to acquire data regarding an operating characteristic of the machine, and wherein the controller is configured to engage the actuator based on the operating characteristic.

9. The machine of claim 8, wherein the operating characteristic includes at least one of a speed of the fan, a temperature of the prime mover, a heat load on an exterior of the cab, or a speed of the machine.

10. The machine of claim 9, wherein the operating characteristic includes the speed of the fan.

11. The machine of claim 9, wherein the operating characteristic includes the speed of the machine.

12. The machine of claim 9, wherein the operating characteristic includes the temperature of the prime mover.

13. The machine of claim 9, wherein the operating characteristic includes the heat load on the exterior of the cab.

14. The machine of claim 5, wherein the controller is configured to differentially control an amount that the one or more baffles of the first debris shield is open relative to an amount that the one or more baffles of the second debris shield is open based on a direction of rotation of the fan.

15. The machine of claim 1, wherein the fan is positioned in front of the cooling pack, or wherein the fan is positioned behind the cooling pack.

16. A cooling system for a machine, the cooling system comprising:
   a debris shield configured to be positioned along a side of a hood of the machine, the debris shield including:
   a shield body defining a plurality of vents;
   a plurality of baffles, each of the plurality of baffles positioned proximate a respective one of the plurality of vents, pivoting about a first end to extend inwardly into the hood of the machine to divert an airflow through the plurality of vents to an exterior of the hood; and
   one or more actuators configured to reposition the plurality of baffles between an open orientation and a closed orientation.

17. The cooling system of claim 16, further comprising:
   a sensor; and
   a controller configured to engage the one or more actuators to selectively reposition the plurality of baffles between the closed orientation and the open orientation based on data received from the sensor.

18. The cooling system of claim 17, wherein the data includes information regarding at least one of a speed of a fan of the machine, a temperature of a prime mover of the machine, a heat load on an exterior of a cab of the machine, or a speed of the machine.

19. The cooling system of claim 16, wherein the debris shield is a first debris shield, further comprising:
   a second debris shield configured to be positioned along an opposing side of the hood; and
   a controller configured to differentially control an amount that the plurality of baffles of the first debris shield are open relative to an amount that the plurality of baffles of the second debris shield are open based on a direction of rotation of a fan of the machine.

20. A machine comprising:
   a chassis;
   a cab coupled to the chassis;
   a hood positioned in front of the cab, the chassis and the hood defining an internal compartment therebetween;
   a prime mover positioned within the internal compartment;
   a cooling pack positioned within the internal compartment;
   a fan positioned within the internal compartment, the fan configured to drive an airflow through the cooling pack;
   a first debris shield positioned along a first side of the internal compartment, the first debris shield at least partially defining a first front tractive element well;
   a second debris shield positioned along an opposing second side of the internal compartment, the second debris shield at least partially defining a second front tractive element well, each of the first debris shield and the second debris shield including:
   a shield body defining a vent;
   one or more baffles positioned proximate the vent, pivoting about a first end to extend inwardly into the internal compartment to divert the airflow through the vent to an exterior of the internal component; and
   an actuator configured to reposition the one or more baffles between an open orientation and a closed orientation;
   a sensor configured to acquire data regarding an operating characteristic of the machine; and
   a controller configured to: engage the actuator based on the operating characteristic to selectively alter an amount of the airflow that is vented from the internal compartment through the vent to an ambient environment; and differentially control an amount that the one or more baffles of the first debris shield is open relative to an amount that the one or more baffles of the second debris shield is open based on a direction of rotation of the fan.

* * * * *